(12) United States Patent
Burgess et al.

(10) Patent No.: US 8,318,506 B2
(45) Date of Patent: Nov. 27, 2012

(54) DIALYSIS ADAPTER CELL AND METHOD OF RELEASE TESTING OF A DISPERSE DOSAGE FORM

(75) Inventors: Diane J. Burgess, Storrs, CT (US); Upkar Bhardwaj, Storrs, CT (US)

(73) Assignee: The University of Connecticut, Farmington, CT (US)

( * ) Notice: Subject to any disclaimer, the term of this patent is extended or adjusted under 35 U.S.C. 154(b) by 103 days.

(21) Appl. No.: 12/714,770

(22) Filed: Mar. 1, 2010

(65) Prior Publication Data

US 2010/0221838 A1 Sep. 2, 2010

Related U.S. Application Data

(60) Provisional application No. 61/156,051, filed on Feb. 27, 2009.

(51) Int. Cl.
*G01N 1/38* (2006.01)
*B01L 1/00* (2006.01)

(52) U.S. Cl. .......... 436/177; 436/52; 422/550; 422/266; 422/281; 210/448; 210/457; 210/497.01

(58) Field of Classification Search .................. None
See application file for complete search history.

(56) References Cited

U.S. PATENT DOCUMENTS 3,672,509 A * 6/1972 Buchmann et al. ...... 210/321.63
5,127,278 A 7/1992 Benz
5,142,920 A * 9/1992 Bart et al. ...................... 73/866
6,308,584 B1 10/2001 Benz
2010/0258497 A1* 10/2010 Morita ....................... 210/323.2

FOREIGN PATENT DOCUMENTS

WO WO2006055756 A2 5/2006

OTHER PUBLICATIONS

<711> Dissolution: Stage 6 Harmonization Official Dec. 1, 2011. The United States Pharmacopeial Convention (2011), 1-8.*
"35 Years of Flow-Through Cell Dissolution: 35 Years of Evolution and Flexibility," SOTAX Pharma Services (2008).*
D'Souza, S. S. et al. "Development of a Dialysis In Vitro Release Method for Biodegradable Microspheres," AAPS PharmSciTech 2005; 6 (2) Article 42, E323-E328.*
Download page For 35 years of Flow-Through Cell Dissolution: 35 years of Evolution and Flexibility' by SOTAX Pharma Services at in-Pharma Technologist.com; downloaded from the internet on Apr. 1, 2012 at URL <http://www.in-pharmatechnologist.com/Product-innovations/(offset)/20/(filter)/Product-Brochures.>.*

(Continued)

*Primary Examiner* — Yelena G Gakh
*Assistant Examiner* — Michelle Adams
(74) *Attorney, Agent, or Firm* — Cantor Colburn LLP

(57) ABSTRACT

A dialysis adapter cell includes a housing comprising a plurality of pillars extending between and attached to a top plate and a bottom plate to form a hollow receptacle, wherein the top plate comprises an aperture configured to provide access to the hollow receptacle; a dialysis membrane disposed about the housing and sealingly engaged to the top plate and the bottom plate; and a platform in physical communication with the bottom plate and configured to position the dialysis adapter cell in a sample holder of a United States Pharmacopoeia dissolution apparatus 4 flow-through cell.

21 Claims, 12 Drawing Sheets

OTHER PUBLICATIONS

Bhardwaj et al., "A novel USP apparatus 4 based release testing method for dispersed systems", Elsevier, International Journal of Pharmaceutics 388 pp. 287-294, Pharmaceutal Nanotechnology; School of Pharmacy, University of Connecticut, 69 North Eagleville Raod, Unit 3092, Storrs, CT 06269 USA ; (2010).

C. Washington, "Drug release from microdisperse systems: a critical review", Elsevier, International Journal of Pharmaceutics, 58 (1990) pp. 1-12; Received May 26, 1989 Accepted Jul. 15, 1989; Department of Pharmacy, University of Nottingham, Nottingham (U.K.).

N. Chidambaram et al, "A Novel In Vitro Release Method for Submicron-Sized Dispersed Systems", AAPS Pharmsci 1999; 1 (3) article 11 (http://www.pharmsci.org); Submitted Apr. 5, 1999; Accepted: Jul. 30, 1999; Published: Aug. 31, 1999; Department of Pharmaceutical Sciences, University of Connecticut, Storrs, Ct., USA.

Peschka et al., "A simple in vitro model to study the release kinetics of liposome encapsulated material", Elsevier, Journal of Controlled Release 56 (1998) pp. 41-51; Received Feb. 19, 1998; accepted Apr. 12, 1998; University of Freiburg, Department of Pharmaceutical Technology, Hermann-Herder-Str. 9, D-79104 Freiburg, Germany.

Saarinen-Savolainen et al., "Method for evaluating drug release from liposomes in sink conditions", pp. 27-33; Elsevier, International Journal of Pharmaceutics 159 (1997); Received Jun. 26, 1997; received in revised from Aug. 7, 1997; accepted Aug. 13, 1997; Department of Pharmaceutical Chemistry, University of Kuopio, P.O. Box 1627, FIN-70211 Kuopio, Finland.

Shabbits et al, "Development of an in vitro drug relase assay that accurately predicts in vivo drug retention for liposome-based delivery systems", Elsevier, Journal of Controlled Release 84 (2002) pp. 161-170, Received Jul. 29, 2002; accepted Sep. 16, 2002; Department of Advanced Therapeutics, British Columbia Cancer Research Centre, Vancouver, BC V5Z 1L3, Canada.

Vemuri et al., "Development and Validation of a Drug Release Rate Method for a Water Soluble Drug in a Liposome Preparation", pp. 1353-1364, Drug Development and Industrial Pharmacy, 21(11), (1995). Department of Pharmaceutical Sciences, Collegel of Pharmacy, The University of Rhode Island, Kingston, RI 02881 USA.

Zolnik et al., "Application of USP Apparatus 4 and In Situ Fiber Optic Analysis to Microsphere Release Testing", pp. 11-14; Dissolution Technologies May 2005; Department of Pharmaceutical Sciences, University of Connecticut, Storrs, CT USA, 06269.

Henriksen et al., "In vitro evaluation of drug release kinetics from liposomes by fractional dialysis", Elsevier, International Journal of Pharmaceutics 119 (1995) pp. 231-238; Received Oct. 3, 1994; revised Dec. 1, 1994; accepted Dec. 7, 1994; Department of Pharmaceutics, University of Oslo, P.O.B. 1068 Blindern, 0316 Oslo, Norway.

Kauffman, "Qualification and Validation of USP Apparatus 4"; Dissolution Technologies; Dissolution Technologies Journal vol. 12, No. 2, May 2, 2005, pp. 41-43, XP002588340, Hockessin, DE 19707, USA; first cited in International Search Report.

International Search Report for PCT/US2010/025717 filed Mar. 1, 2010.

Written Opinion for PCT/US2010/025717 filed Mar. 1, 2010.

[No Author], "Float-A-Lyzer G2—Ready-to-Use Dialysis Device", Spectrum Labs.com, internet pamphlet: www.spectrumlabs.com/dialysis/FloatALyzer.html; (2 pp.), printed from the internet on Feb. 2, 2012.

[No Author] "USP Authenticity Certificate: USP 32-NF 27", US Pharmacopeia (May 1, 2009), 37 Rev. 27 Edition, (1), pp. 267-268.

* cited by examiner

DIALYSIS ADAPTER CELL AND METHOD OF RELEASE TESTING OF A DISPERSE DOSAGE FORM

CROSS REFERENCE TO RELATED APPLICATION

This application claims the benefit of U.S. Provisional Application Ser. No. 61/156,051 filed Feb. 27, 2009, which is fully incorporated herein by reference in its entirety.

BACKGROUND

This application relates to a dialysis adapter cell and method of use, and especially relates to the use of the adapter cell in a United States Pharmacopoeia dissolution apparatus 4 for in vitro release testing of disperse dosage forms.

Drug delivery systems such as microspheres, liposomes, nanosuspensions, microemulsions, and the like have been the subject of significant research and development efforts. The advantages of these systems include the potential for controlled/modified delivery, targeted delivery, localized delivery, decreased dose, reduced toxicity, and protection of labile drugs (such as proteins) from degradation prior to and after administration. Several microsphere, nanosuspension, emulsion and liposome formulations have been approved by the United States Food and Drug Administration (FDA), and the number of such products is likely to increase rapidly with the advances in protein and gene therapeutics and the large number of new candidates with poor aqueous solubility.

In order to assure the performance and safety of these delivery systems, as well as to assist in the product development process, in vitro testing methods have been developed. In vitro release is an important indicator of in vivo product performance. Accordingly, in vitro release tests are used for routine assessment of process quality control, formulation optimization in product development, development of in vitro-in vivo relationships (IVIVR), and the like. In addition, in vitro release methods can also be applied for evaluation of scale-up and post approval changes (SUPAC), in cases where an approved IVIVR exists.

A variety of methods have been used for in vitro release testing of these drug delivery systems. Currently used methods for in vitro release testing from these dosage forms can be broadly divided into three categories: 1) membrane dialysis methods (such as dialysis sac, reverse dialysis sac, microdialysis, and Franz diffusion cells); 2) sample and separate methods (such as vial/tube/bottle methods with centrifugation or filtration after sampling); and 3) flow-through cell methods. These techniques are required to isolate the dosage form from the release medium for analytical purposes. None of these methods use an official United States Pharmacopoeia (USP) dissolution/release apparatus. In addition, the procedures and apparatuses used can vary among laboratories. Due to this lack of a standard method, results from different sources are usually not comparable. Moreover, some of the methods mentioned above are subject to high variability and have limitations, such as violation of sink conditions.

The lack of standard pharmacopoeial/regulatory tests for controlled release parenteral products is a major obstacle in the development and regulatory process of the products. In particular, the need for standards in in vitro release methods on colloidal disperse formulations like liposomes, microemulsions, nanosupsensions, or other like systems has not yet been met.

BRIEF DESCRIPTION

The above-described and other needs are met by a dialysis adapter cell comprising a housing comprising a plurality of pillars extending between and attached to a top plate and a bottom plate to form a hollow receptacle, wherein the top plate comprises an aperture configured to provide access to the hollow receptacle; a dialysis membrane disposed about the housing and sealingly engaged to the top plate and the bottom plate; and a platform in physical communication with the bottom plate and configured to position the dialysis adapter cell upright in a sample holder of a United States Pharmacopoeia dissolution apparatus 4 flow-through cell.

Systems for in vitro release testing of a colloidal disperse system comprising the above-described dialysis adapter cell are also described. In one embodiment, a system for in vitro release testing of a colloidal disperse system comprises a United States Pharmacopoeia dissolution apparatus 4 system comprising a dissolution medium reservoir; a pump in fluid communication with the dissolution medium reservoir and a flow-through cell, wherein the pump is configured to move the dissolution medium through the flow-through cell; the flow-through cell comprises a sample holder mounted in fluid communication with a filter system; and a dialysis adapter cell disposed in the sample holder and configured to contain the colloidal disperse system, comprising a housing having a plurality of pillars extending between and attached to a top plate and a bottom plate to form a hollow receptacle, wherein the top plate comprises an aperture configured to provide access to the hollow receptacle; a dialysis membrane disposed about the housing and sealingly engaged to the top plate and the bottom plate; a platform in physical communication with the bottom plate configured to position the dialysis adapter cell upright in the sample holder.

Methods for the in vitro release testing of a disperse dosage are also described. In one embodiment, a method for the in vitro release testing of a colloidal disperse system comprises placing the colloidal disperse system in a dialysis adapter cell, wherein the dialysis adapter cell comprises a housing having a plurality of pillars extending between and attached to a top plate and a bottom plate to form a hollow receptacle, wherein the top plate comprises an aperture configured to provide access to the hollow receptacle; a dialysis membrane disposed about the housing and sealingly engaged to the top plate and the bottom plate; a platform in physical communication with the bottom plate; placing the dialysis adapter cell in a sample holder of a United States Pharmacopoeia dissolution apparatus 4 flow-through cell; pumping a dissolution medium through the flow-through cell to contact the dialysis adapter cell; and detecting a component of the disperse dosage form in the dissolution medium.

The above described and other features are exemplified by the following figures and detailed description.

BRIEF DESCRIPTION OF THE DRAWINGS

The components in the drawings are not necessarily to scale, emphasis instead being placed upon clearly illustrating the principles of the embodiments described herein. Moreover, in the drawings, like reference numerals designate corresponding parts throughout the several views.

DETAILED DESCRIPTION

Figure 1:
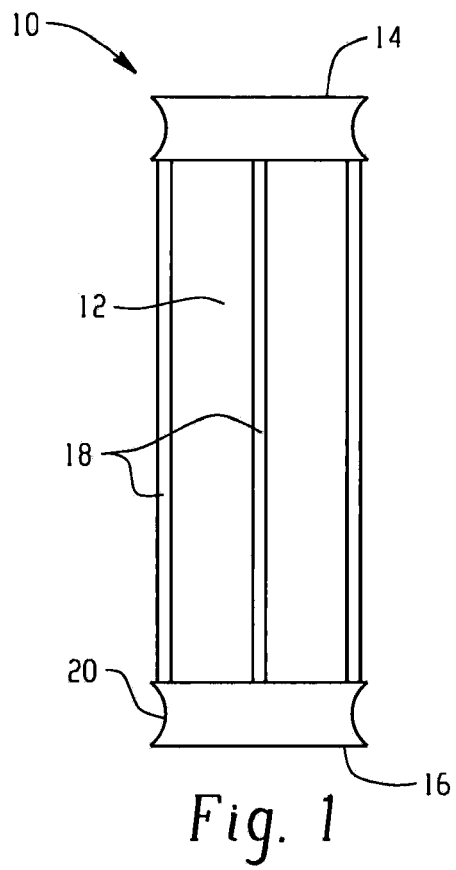
FIG. 1 is a schematic illustration of an exemplary embodiment of a dialysis cell adapter without the dialysis membrane disposed about the cylinder.

Disclosed herein is a dialysis adapter cell for use in conjunction with compendial United States Pharmacopoeia (USP) dissolution apparatus 4. The dialysis adapter cell renders the USP dissolution apparatus 4 suitable for in vitro release testing of disperse dosage forms, such as nanosuspensions, liposomes, microemulsions, and the like. Use of the dialysis adapter cell with the USP dissolution apparatus 4 eliminates the variations associated with existing methods used for release testing of disperse dosage forms. Specifications for the USP dissolution apparatus 4 have been set by the USP to eliminate variations in flowthrough testing with the apparatus. However, the sample cell of the USP dissolution apparatus 4 is insufficient for disperse dosage forms since the small particles can block and even pass through the filters in the cell. Using filters with smaller pore sizes with the USP dissolution apparatus 4 cell also does not work, because undesirable backpressure occurs in the system. The dialysis adapter cells described herein are designed to be used with the standard sample holder cells, but are adapted to be suitable for dispersion dosage forms. The dialysis adapter cell, therefore, has the potential to be adopted as a preferred component in in vitro testing during formulation development and process quality control of disperse dosage forms. As used herein, a "disperse dosage form" means a drug delivery vehicle having two or more phases, wherein at least one of the phases is dispersed within another phase. The dispersed phase can have an average particle size of 1 micrometer or less, specifically 0.5 micrometer or less, even more specifically 0.1 micrometer or less. A "disperse dosage form" may be formed by a variety of methods, and includes, without limitation, colloids, emulsions, microemulsions, nanoemulsions, microsuspensions, nanosuspensions, liposomes, cubosomes, inclusion complexes, nano spheres, nanocapsules, nanochelates, and the like.

The dialysis adapter cell is configured for use with a standard sample holder cell of the USP dissolution apparatus 4. There are several different types (e.g., sizes, shapes) of sample holder cells used with the USP dissolution apparatus 4. The dialysis adapter cell, therefore, is generically designed so that it can be adapted to fit with 12 millimeter (mm) and 22.6 mm sample holder cells. The dialysis adapter cell is configured to serve as an isolation chamber for a disperse dosage form. A dialysis membrane is disposed around the isolation chamber, such that the disperse dosage is held within the dialysis adapter cell, but the dissolution media can flow into contact with and around the dialysis adapter cell, then through the dissolution apparatus, carrying with it any solute(s) (i.e., active pharmaceutical ingredient or other component) that have been released from the dispersed dosage form. During disperse dosage form release testing, the dialysis adapter cell is disposed within the sample holder cell of the USP dissolution apparatus 4. The dialysis adapter cell, therefore, can have any shape configured to fit within a standard apparatus 4 sample holder cell; hold the disperse dosage form; and permit flow of the dissolution medium through the adapter cell.

FIG. 1 illustrates an exemplary embodiment of a dialysis adapter cell 10. The dialysis adapter cell 10 is configured to be disposed in a standard apparatus 4 sample holder cell, such as the 12 mm or 22.6 mm diameter sample holders. The dialysis adapter cell 10 comprises a receptacle, e.g., a hollow cylinder 12 having a top 14 and a base 16. Shapes other than a cylinder can be used. A plurality of pillars 18 connect the top 14 to the base 16 and form the receptacle, e.g., cylinder structure 12. While FIG. 1 shows the dialysis adapter cell 10 as having three pillars 18, the dialysis adapter cell can have any number of pillars suitable to form the cylinder 12 without interfering with the operation of the adapter cell, such as the flow of dissolution medium into the cell. The plurality of pillars 18 can be formed of a material that provides rigid support between the top 14 and base 16, and that is inert to the dissolution mediums typically used in dissolution testing. In one embodiment, the plurality of pillars 18 are metallic wires.

Figure 2:
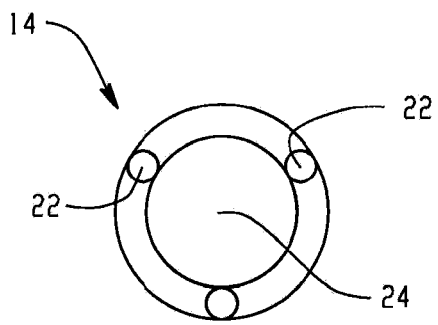
FIG. 2 is a schematic illustration of an exemplary embodiment of a top plate for the dialysis cell adapter of FIG. 1.

The top 14 and base 16 are configured to seal the ends of the hollow receptacle, and in FIG. 1 are illustrated as circular plates. In another embodiment, the top and base can have non-circular shapes that can be corresponding or different. Moreover, the top 14 and base 16 can have a shape that corresponds to the overall shape of the receptacle 12 or the shapes can be different. Like the pillars, the top and base plates are formed of a material that provides rigid support to the ends of the adapter cell cylinder, and that is inert to the dissolution mediums typically used in dissolution testing. In one embodiment, the top and base plates comprise polymers such as poly(ether ether ketone), poly(sulfone), poly(vinylidene chloride), and fluoropolymers, such as polytetrafluoroethylene (PTFE). Each of the top 14 and base 16 plates can further comprise a groove 20 disposed around the circumference of the plate. As will be discussed in more detail below, the groove is configured to engage an elastic, resilient member such as an O-ring, which can be used to affix a dialysis membrane to the cylinder 12. FIG. 2 is a top-down schematic view of the top plate 14. The figure illustrates the circular plate and the attachment points 22 of the plurality of pillars 18 to the top plate 14. In this embodiment, the top plate 14 further comprises an aperture 24 configured to provide access to the interior of the cylinder 12. After a disperse dosage has been placed in the dialysis adapter cell 10, the aperture 24 can be sealed with a plug, lid, or the like. In one embodiment, the aperture 24 has a corresponding lid (not shown), which can be latched to the top plate 14 with a fastener such as a hex screw.

Figure 3:
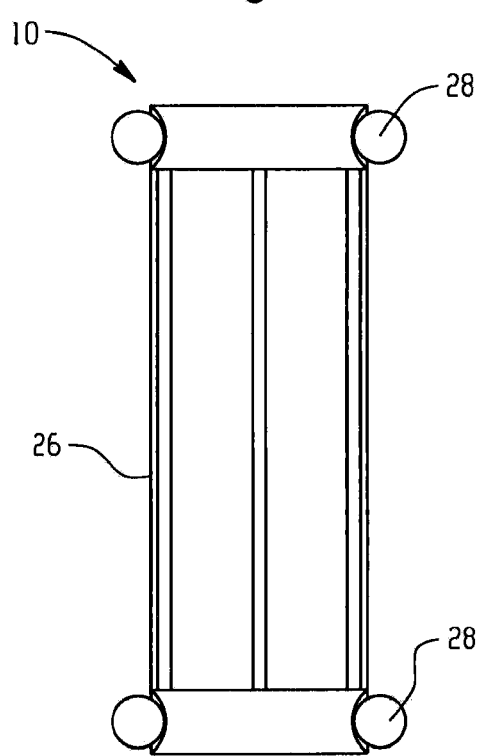
FIG. 3 is a schematic illustration of an exemplary embodiment of a dialysis cell adapter including the dialysis membrane disposed thereon.

A dialysis membrane 26, as shown in FIG. 3, is disposed about the cylinder 12. The dialysis membrane 26 is attached to the cylinder at the top 14 and bottom 16 plates, and is sealed to the cylinder 12 with O-rings 28 that engage the dialysis membrane 26 to the grooves 20 of the top and bottom plates. The dialysis membrane 26 is formed of a specific material configured to allow the dissolution medium and dissolved dosage form to flow there through, while also preventing the solid form of the disperse dosage to pass through the membrane 26. Exemplary dialysis membrane materials include, without limitation, a cellulose material, such as regenerated cellulose or acetic cellulose, cellulose ester or a macromolecular material, such as polyacrylonitrile copolymer or polymethyl methacrylate, polysulfone, polyamide, polyacrylonitrile, and their co-polymers, polytetrafluoroethylene and their derivatives.

Figure 4:
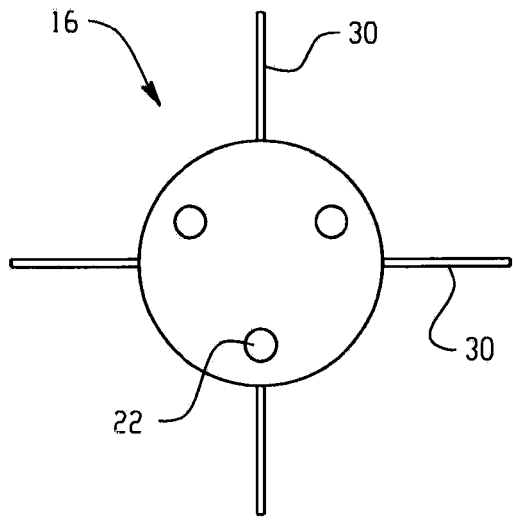
FIG. 4 is a schematic illustration of an exemplary embodiment of a bottom plate and platform for the dialysis cell adapter of FIG. 1.

The dialysis adapter cell 10 is fixed onto a platform designed to fit the diameter dimensions of the intended USP standard apparatus 4 sample holder cell. FIG. 4 illustrates a top-down schematic view of one embodiment of a platform 30. The platform 30 is attached to the bottom plate 16. The platform 30 can have any shape configured to hold the dialysis adapter cell within the sample holder cell. The lower portion of a USP standard apparatus 4 sample holder typically has a conical configuration. The platform, therefore, is configured to set on the top of this conical configuration, thereby holding the dialysis adapter cell above the conical portion of the sample holder cell. In the embodiment of FIG. 4, the platform 30 has a cross-shape with four platform legs that are configured to hold the dialysis adapter cell centered and upright within the sample holder cell.

As mentioned previously, in one embodiment the dialysis adapter cell is configured for use in conjunction with the standard 22.6 mm and 12 mm sample holder cells for the USP dissolution apparatus 4. For example, when used with a standard 22.6 mm diameter sample holder, the dialysis adapter cell has a diameter of about 9 mm, a total height of about 33 mm, and a top and bottom plate thickness of about 3 mm respectively, for a total adapter cell volume of about 1.7 milliliters (ml). When a smaller sample holder is desired, such as a 12 mm diameter sample holder, the dialysis adapter cell is configured for the smaller size of the holder. For example, a dialysis adapter cell for the 12 mm sample holder can have a cell diameter of about 6 mm, a total height of about 48 mm, and a top and bottom plate thickness of about 2.5 mm respectively, for a total cell volume of about 1.1 ml. The dimensions of the dialysis adapter cell design as illustrated in FIGS. 1-4 can be varied to correspond with the dimensions of other sizes of sample holders. The particular dimensions of the adapter cell are simply adjusted accordingly based on the size of the desired sample holder.

The USP dissolution apparatus 4 system was originally designed as an in vitro dissolution method for controlled release oral powders, granules, and solid dispersions. The system can be operated under different conditions, such as open or closed configurations, and with different flow rates and temperatures. The diversity of available sample holder types allows application to a wide range of dosage forms. Moreover, since the reservoir volume is not fixed, the volume of the medium can be decreased to accommodate systems where the concentration of drug released would otherwise be below the detection limit, or increased to allow ease of maintenance of sink conditions for poorly soluble compounds. The flexibility of the USP dissolution apparatus 4 system makes it practical for use with the dialysis adapter cell 10. The dialysis adapter cell 10 renders the USP dissolution apparatus 4 system suitable for in vitro release testing of disperse dosage forms.

Figure 5:
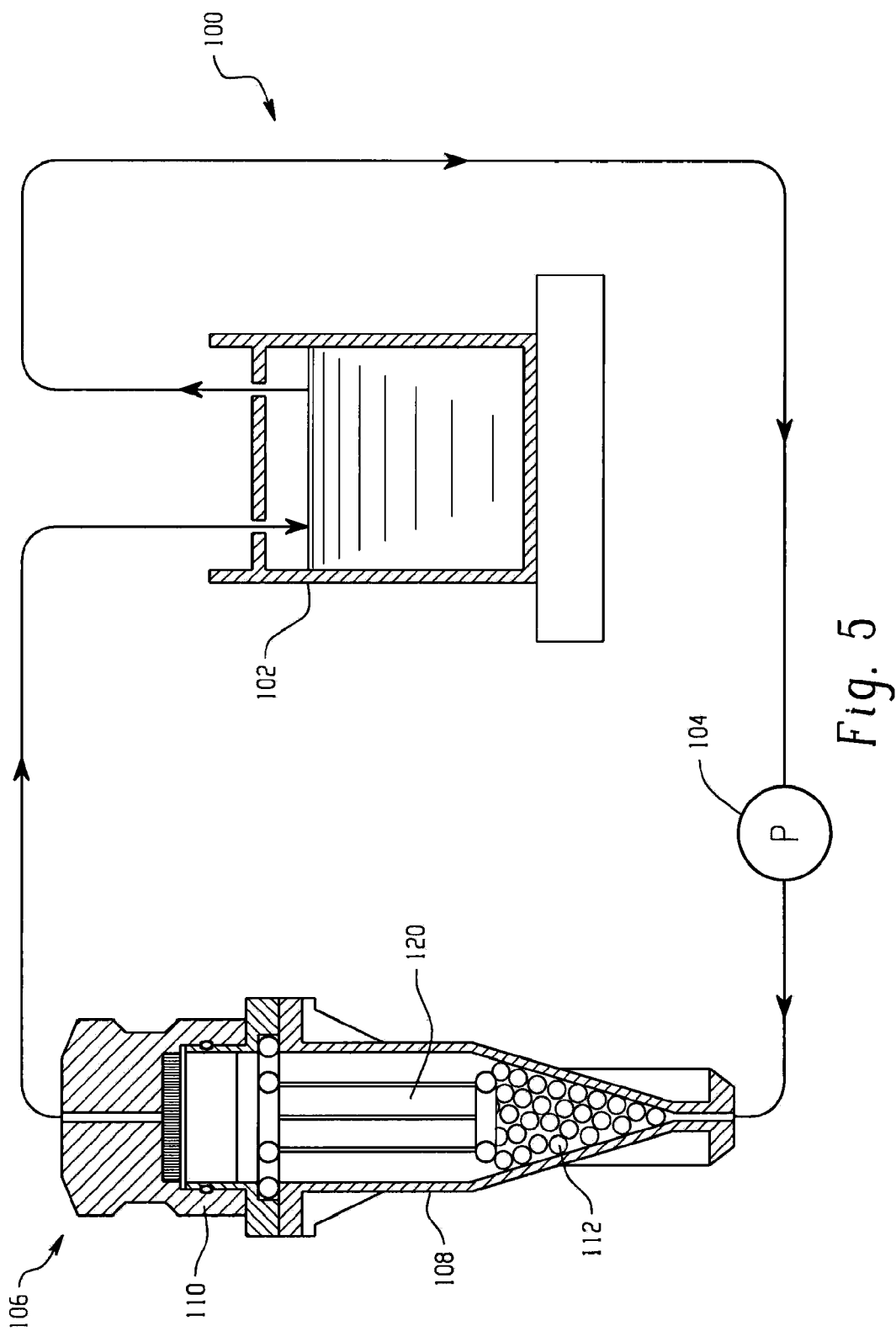
FIG. 5 is a schematic illustration of an exemplary embodiment of a dialysis cell adapter disposed in the sample holder cell of a flow-through United States Pharmacopoeias dissolution apparatus 4 system.

FIG. 5 shows an exemplary embodiment of a USP dissolution apparatus 4 (flow-through) system 100 used in conjunction with the dialysis adapter cell described above. This figure shows the USP dissolution apparatus 4 system 100 in a closed configuration, meaning a finite amount of dissolution medium is recirculated through the sample holder cell. It is to be understood that the dialysis adapter cell can be also be used when the USP dissolution apparatus 4 system 100 is operated with an open configuration, wherein dissolution medium is not recirculated, but rather flows through the cell, for example to a fraction collector. The USP dissolution apparatus 4 system 100 comprises the dissolution medium reservoir 102 in fluid communication with a pump 104. The pump 104 is configured to pump the dissolution medium from the reservoir 102, through a flow-through cell 106 and back into the reservoir. The pump 104 is separated from the dissolution medium reservoir 102 in order to shield the reservoir against any vibrations originating from the pump. The flow-through cell 106 is configured to direct the dissolution medium through the sample holder 108, where the controlled/delayed release formulation is located. The flow-through cell can be formed of a transparent, inert material and comprises the sample holder 108 vertically mounted with a filter system 110. The filter system 110 prevents escape of undissolved dosage particles from the top of the sample holder 108. The lower portion of the sample holder 108, where the dissolution medium enters the flow-through cell, has a conical shape. The conical portion of the sample holder 108 can be filled with glass beads 112, as shown in FIG. 5. In one embodiment, the glass beads are about 1 mm in diameter and are disposed over a single larger glass bead of about 5 mm in diameter. The larger glass bead is positioned at the apex of the conical portion to protect the fluid entry point of the flow-through cell. The sample holder 108 is removable from the flow-through cell 106. A cell holding cap and O-rings (not shown) are used to fix the sample holder and filter system 110 within the flow-through cell.

While standard USP dissolution apparatus 4 systems have a tablet holder for positioning of special dosage forms, such as inlay tablets, the system 100 utilizes the dialysis adapter cell 120 so that disperse dosage forms, can undergo in vitro release testing. The dialysis adapter cell is disposed upright within the sample holder 108. The platform attached to the base plate of the dialysis adapter cell holds the adapter cell upright and centered above the conical portion of the sample holder 108.

In operation, the disperse dosage form is placed in the cylinder of the dialysis adapter cell 120. The dosage form can be inserted into the adapter cell through the aperture and then the aperture can be covered with a lid that is locked into place. The dialysis adapter cell 120 is then placed upright within the sample holder 108 and both components are placed in the flow-through cell 106. The filter system 110 is in fluid communication with the sample holder. The dissolution medium from the reservoir 102 is warmed to 37+/−5 degrees Celsius (° C.) (or to any required temperature) by passing through inline metallic coils immersed in a thermostatic water bath and pumped through the bottom of the flow-through cell 106. The pump 104 forces the dissolution medium upwards through the flow-through cell 106 and into contact with the dialysis adapter cell 120. The pump can have a delivery range between about 240 and about 960 ml per hour, with standard flow rates of 4, 8, and 16 ml per minute as per the USP. Other flow rates can be utilized depending upon the pump used, for example, one pump can operate in range of 8-50 ml/min while another can operate in a range of 1.5-35 ml/min. The pump preferably delivers a constant flow independent of the flow resistance in the filter system 110. The pump delivers the dissolution medium through the flow-through cell 106 to contact the dialysis adapter cell 120. The dissolution medium can be recirculated through the system 100. Samples can be withdrawn from the medium reservoir at specified time points after the dissolution medium is pumped through the flow-through cell 106. Analysis is performed on each of the samples to determine the presence of a component of the disperse dosage form therein for a given time. Each of the samples can be replaced with fresh dissolution media.

Alternatively, where the dissolution medium is not recirculated, aliquots of the dissolution medium over time after contacting with the dialysis adapter cell 120 can be analyzed to determine the presence of a component of the disperse dosage form. Most conveniently, the dissolution medium is collected in fractions, for example by a fraction collector.

The invention is further illustrated by the following non-limiting Examples. The Examples are merely exemplary and are intended to further explain and not to limit the system and method disclosed herein.

EXAMPLES

A dialysis adapter cell was designed as described herein; disposed in a standard USP dissolution apparatus 4; and evaluated with solution, suspension, and liposome dosage forms of dexamethasone to analyze the feasibility of the dialysis adapter cell for controlled release testing. Each of the liposome dosage forms had formulations with different release kinetics to determine the discriminatory ability of the dialysis adapter cell based method described herein. In addition, in vitro release of dexamethasone from the liposomes formulations was investigated with two of the current, commonly used controlled release methods: dialysis sac (DS) and reverse dialysis sac (RDS). The results of these existing methods were compared with the dialysis adapter cell (DAC) method described herein. The dialysis-based methods were selected since they are more suitable for deformable formulations such as liposomes. Sample and separate methods, another type of commonly used method, poses two limitations: an artificially higher release might be obtained due to the separation process as a result of vesicle fusion during high speed centrifugation or filtration of smaller size particles during filter separation; and an erroneous release could result if the separation method is of the same time scale as the release study.

Materials

Dexamethasone, sodium azide, sodium dodecyl sulfate (SDS), 4-(2-hydroxyethyl)-1-piperazineethanesulfonic acid (HEPES) buffering agent, and sodium salts were purchased from Sigma-Aldrich®. 1,2-Dipalmitoyl-sn-glycero-3-phosphocholine (DPPC), 1,2-dimyristoyl-sn-glycero-3-phosphocholine (DMPC), 1,2-distearoyl-sn-glycero-3-phosphocholine (DSPC), and cholesterol were purchased from Avanti® Polar Lipids, Inc. Maxidex® ophthalmic suspension of dexamethasone (0.1% weight/volume (w/v)) was purchased from Alcon® Laboratories. Chloroform, acetonitrile, and methanol were purchased from Thermo Fisher Scientific®. Spectra/Por® DispoDialyzer® Membranes (50 kilodalton (kDa) molecular weight cut off (MWCO); 2 ml volume) and Spectra/Por® Biotech (50 kDa MWCO) cellulose ester dialysis membranes were purchased from Spectrum® Laboratories. Water from a Barnstead Nanopure® water purification system was used for all the examples.

Preparation of Liposomes

A thin-film hydration method was used to prepare dexamethasone-loaded liposomes. A chloroform solution of lipid and a methanol solution of dexamethasone were mixed in a pear-shape flask and evaporated on a Büchi® rotary evaporator at a temperature above the phase transition temperature(s) (Tm) of lipids to form a thin film (lipid:drug ratio—1:0.2 molarity (M)). This film was dried overnight under vacuum for complete removal of the solvents. The lipid film was then hydrated in 10 mM HEPES buffer, having a pH of 7.4 with 0.1% w/v sodium azide as a preservative at a temperature greater than the phase transition temperature. The hydration was followed by vortexing for two minutes to a final lipid concentration of 1.2 milligrams per ml (mg/ml). These vortexed vesicles were used as large multilamellar, non-extruded liposomes (referred to as "non-extruded liposomes" henceforth). For preparation of small extruded liposomes, non-extruded liposomes were sonicated for 4 minutes using an Avanti® Ultrasonic cleaner bath sonicator (T>Tm), followed by extrusion 11 times through a 400 nanometer (nm) polycarbonate membrane (T>Tm) using an Avanti MiniExtruder® for size homogenization (referred to as "extruded liposomes" henceforth). The non-entrapped dexamethasone was removed using the Amicon Ultra-15® centrifugal filtration devices 30 kDa MWCO. Briefly, a 5 ml liposome suspension was added to the upper chamber of the ultrafiltration tube and filtered to 500 µl by centrifugation at about 3800 g (10° C.) using a Beckman Coulter Allegra® X-15R centrifuge. Non-entrapped drug filtered into the bottom chamber of ultrafiltration tube and the purified liposome suspension was collected from the upper chamber.

Example 1

Dialysis Sac Method (DS)

The pore size of the dialysis membrane can limit the diffusion across the membrane. Therefore, a 50 kDa MWCO Spectra®/Por CE DispoDialyzer® dialysis membrane was selected after screening different MWCO dialysis membranes for diffusion of dexamethasone. Liposome suspensions were added to the Spectra®/Por CE DispoDialyzer® 50 kDa MWCO membranes. The dialysis sacs containing the liposome suspensions were placed in 25 mm by 200 mm Kimax® glass culture tubes containing 50 ml HEPES buffer maintained at 37° C. in a New Brunswick Scientific shaker water bath and rotated at 50 revolutions per minute (rpm). One ml aliquots were withdrawn at each time point for release estimation and replaced with fresh buffer. Dexamethasone was analyzed using High Performance Liquid Chromatography (HPLC), which is described below. In case of incomplete release, or if a plateau was reached, SDS was added to a final concentration of 0.5% w/v to disrupt the liposomes and confirm complete recovery. Addition of SDS is indicated by an arrow in all of the following figures. The results were reported as mean+/−SD (n=3).

Example 2

Reverse Dialysis Sac Method (RDS)

Release testing for this method was performed in glass tubes (Pyrex®; 38 mm×200 mm) containing 125 ml HEPES buffer maintained at 37° C. in the New Brunswick Scientific shaker water bath and rotated at 50 rpm. Spectra®/Por CE DispoDialyzer® 50 kDa MWCO dialysis sacs containing HEPES buffer were placed in each glass tube. Liposome suspensions were added to the medium outside of dialysis sacs. At each time point, a dialysis sac was removed from each tube and one ml aliquot was withdrawn from the interior of dialysis sac for release estimation. The buffer inside the dialysis sac was replenished with fresh buffer after sampling. In case of incomplete release or if a plateau was reached, SDS was added to a final concentration of 0.5% w/v for disruption of liposomes and estimation of complete recovery. Dexamethasone was analyzed using the HPLC method. The results were reported as mean+/−SD (n=3).

Example 3

Dialysis Adapter Cell—USP Dissolution Apparatus 4 Method (DAC)

The dialysis adapter cell was designed as described above and shown in FIGS. 1-4. The dialysis cell was used in conjunction with an apparatus 4 standard 22.6 mm diameter sample holder cell. The dialysis adapter cell had a hollow cylinder with top and base plates of cylinder made from PTFE (Teflon®). The circular Teflon® plates had groves formed on the outer circumference to engage O-ring seals. The top and base plates were supported by three metallic wires (pillars) that provided the framework for the adapter cell. The top plate had an opening that could be closed with a screw. A cellulose ester dialysis membrane was placed over the frame and sealed with the O-rings at the top and bottom grooves. The dialysis adapter cell, with the dialysis membrane, was fixed on a cross-shaped platform, which fit the 22.6 mm USP apparatus 4 sample holder cell dimensions. This final assembled adapter cell was placed in the upright position inside the USP apparatus 4 sample holder cells. The specific dimensions of the dialysis adapter cell were: height—33 mm; diameter—9 mm; top and base plate thickness—3.5 mm; total volume—1.7 ml.

A Sotax™ CE7 USP apparatus 4 flow-through cell dissolution system equipped with 22.6 mm diameter cells was used at 37° C. A 5 mm diameter ruby bead was placed at the base of the 22.6 mm sample holder cell and 4 grams of 1 mm diameter glass beads were added to fill the bottom conical portion of the sample holder cell. Formulations (solution, suspension, or liposomes) were added to the dialysis adapter cell and the opening in the top plate was sealed with a screw. The dialysis adapter cell was placed in the USP 4 sample holder cell (as shown in FIG. 5) for the release studies. The effect of flow rate on drug release from suspension and liposome formulations was evaluated by varying the flow rates between 8 and 16 ml/min. The USP apparatus 4 release studies conducted at a flow rate of 16 ml/min were used for comparison of the dialysis adapter cell method with the DS and RDS methods. At each time point, one ml samples were withdrawn from the dissolution medium reservoirs of the USP apparatus 4. The samples were replenished with fresh dissolution media. Dexamethasone was analyzed via HPLC. The results were reported as mean+/−SD (n=3).

Dexamethasone Analysis—HPLC Method

Dexamethasone was analyzed using an HPLC method. The method was performed using acetonitrile/water/phosphoric acid (35:65:0.5 v/v/v) mobile phase with a Zorbax® Rx C18 4.6 mm by 15 centimeter (cm) column at flow rate of 1 ml/min. Dexamethasone was detected at 242 nm using a PerkinElmer® 785 UV-Vis detector.

Optimization Studies of the DAC Method

Figure 6:
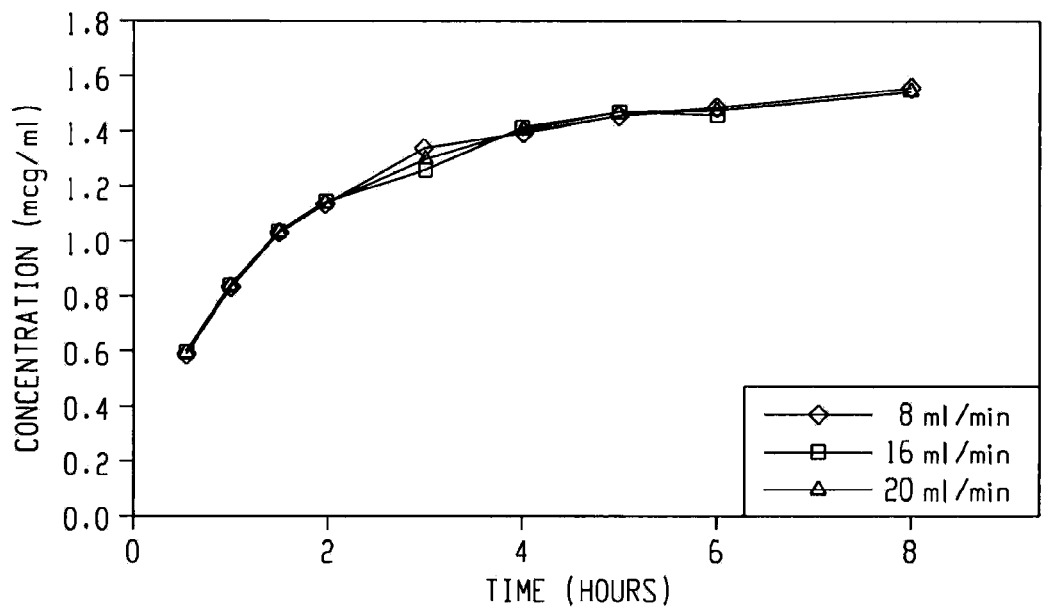
FIG. 6 is a graphic illustration of the effect of different flow rates on dexamethasone release from solution using the dialysis adapter cell method.
Figure 7:
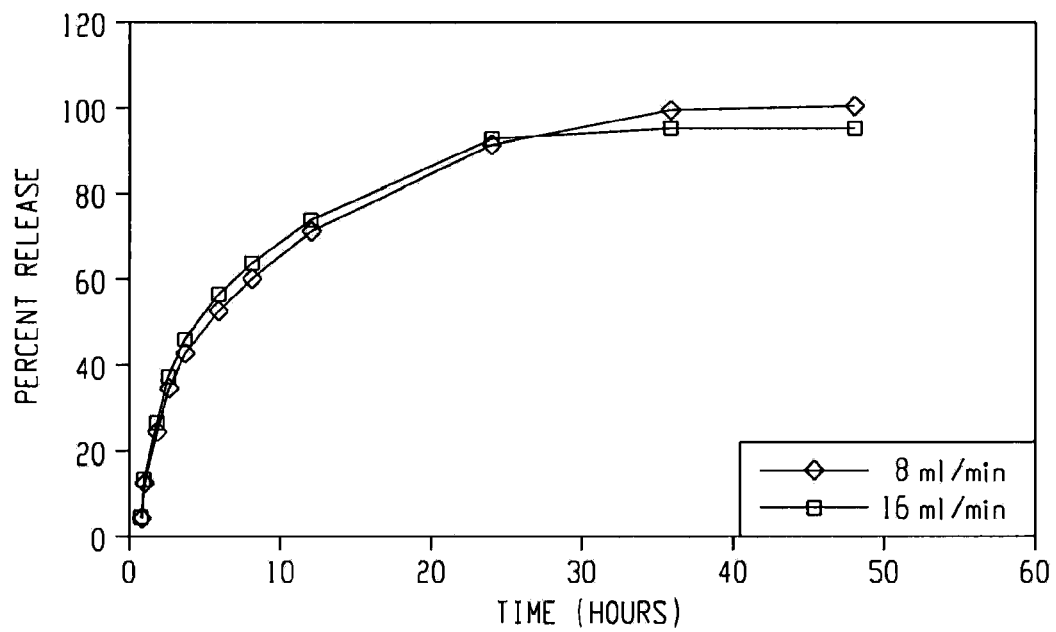
FIG. 7 is a graphic illustration of the effect of different flow rates on dexamethasone release from suspensions using the dialysis adapter cell method.
Figure 8:
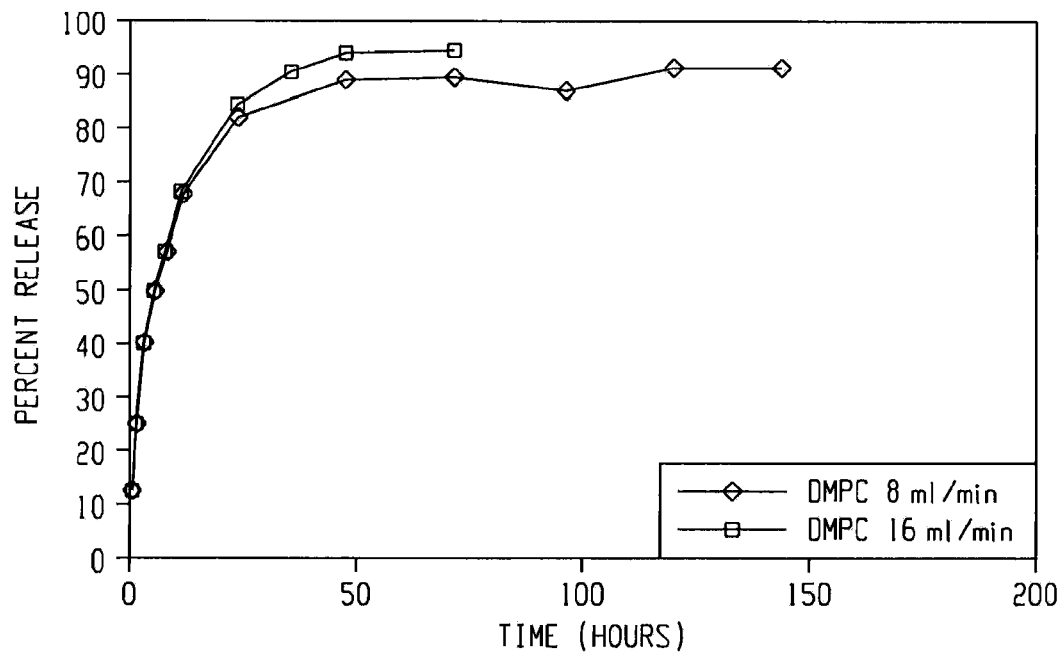
FIG. 8 is a graphic illustration of the effect of different flow rates on dexamethasone release from non-extruded DMPC liposomes using the dialysis adapter cell method.
Figure 9:
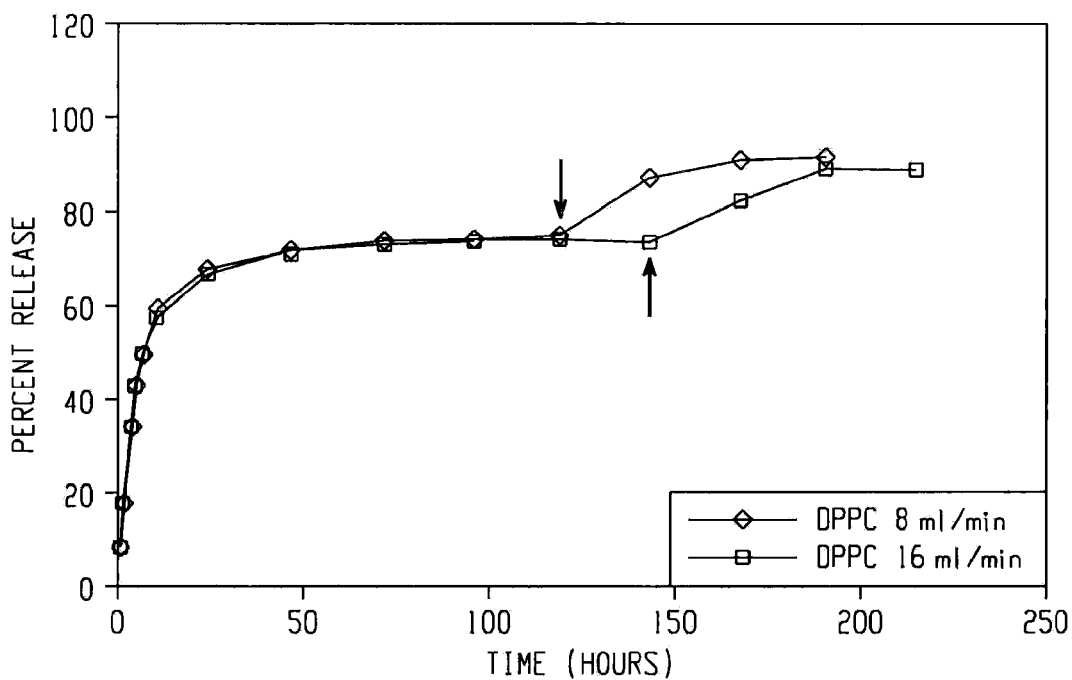
FIG. 9 is a graphic illustration of the effect of different flow rates on dexamethasone release from non-extruded DPPC liposomes using the dialysis adapter cell method.

Increase in the flow rate from 8 to 16 and 20 ml/min did not appear to have any effect on the diffusion of dexamethasone solution from the dialysis adapter cell to the dissolution media. At all flow rates, a majority of the drug had diffused out in 4 hours. FIG. 6 graphically illustrates the concentrations of the dexamethasone in the dissolution medium at different flow rates for release from a solution. FIG. 7 graphically illustrates the effect of flow rate on dexamethasone release from the Maxidex® suspension. As occurred with the solution, increase in the flow rate from 8 to 16 ml/min also did not have any significant effect on dexamethasone release from suspension. Similarly, variations in flow rate did not have an appreciable affect on the non-extruded DMPC liposomes (FIG. 8) and the non-extruded DPPC liposomes (FIG. 9). It is noted that release from the non-extruded DMPC liposomes was faster compared to that from the non-extruded DPPC liposomes at 37° C.

Figure 10:
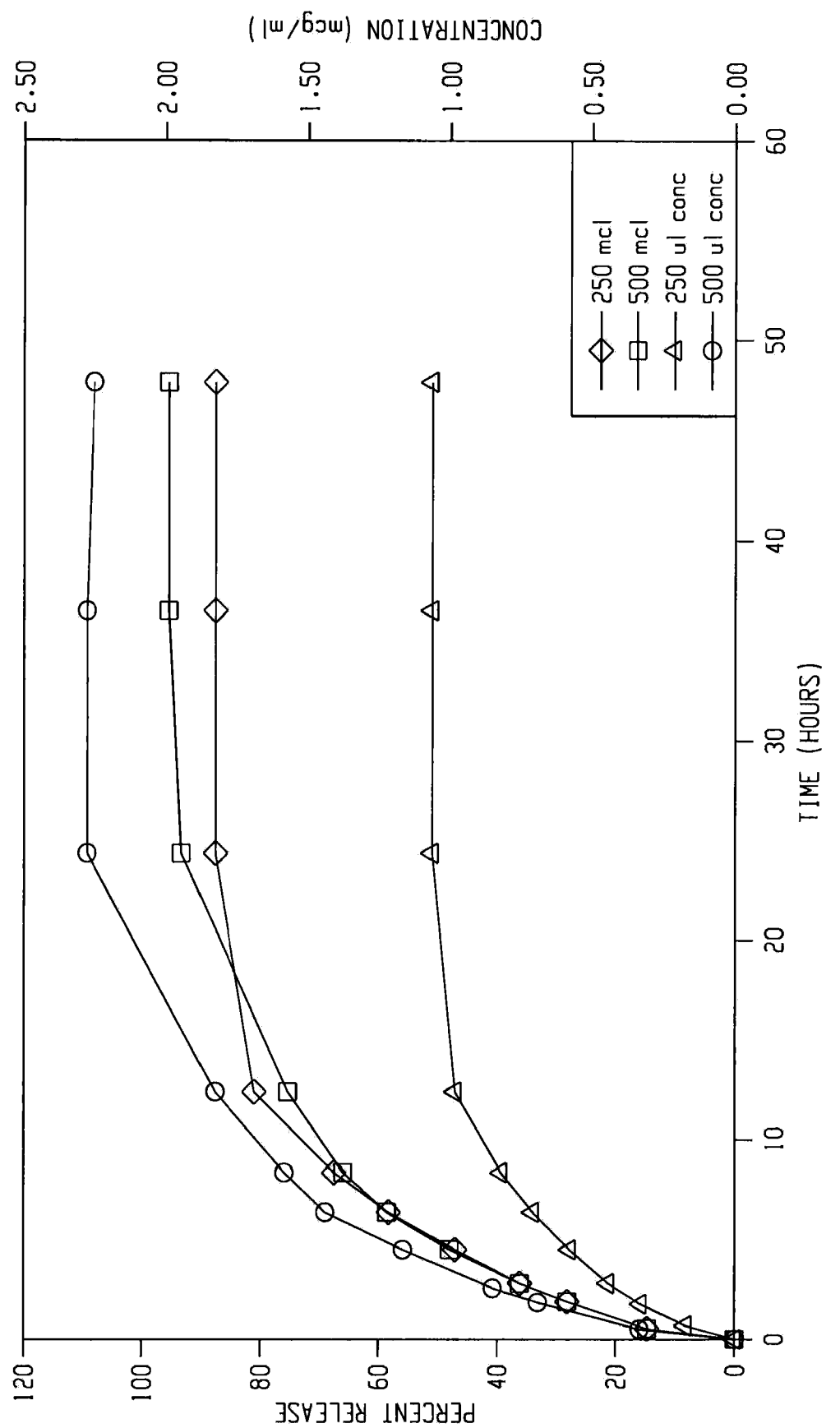
FIG. 10 is a graphic illustration of the effect of different sample volume in the dialysis adapter cell on release from a suspension.

Turning now to FIG. 10, the effect of sample volume on release rate from the Maxidex® suspension is illustrated. The sample volume was reduced from 500 microliters (μl) to 250 μl. The profiles were evaluated at a flow rate of 16 ml/min. As can be seen in FIG. 10, reducing the sample volume of the suspension in the dialysis adapter cell did not have a marked effect on the release rates. The normalized release profiles are shown in the figure. The right/secondary y-axis of FIG. 10 illustrates the effect of sample size on concentration as a function of time. Equilibrium for the 250 μl sample was reached by 12 hours, whereas the 500 μl sample required 24 hours to reach equilibrium.

Figure 11:
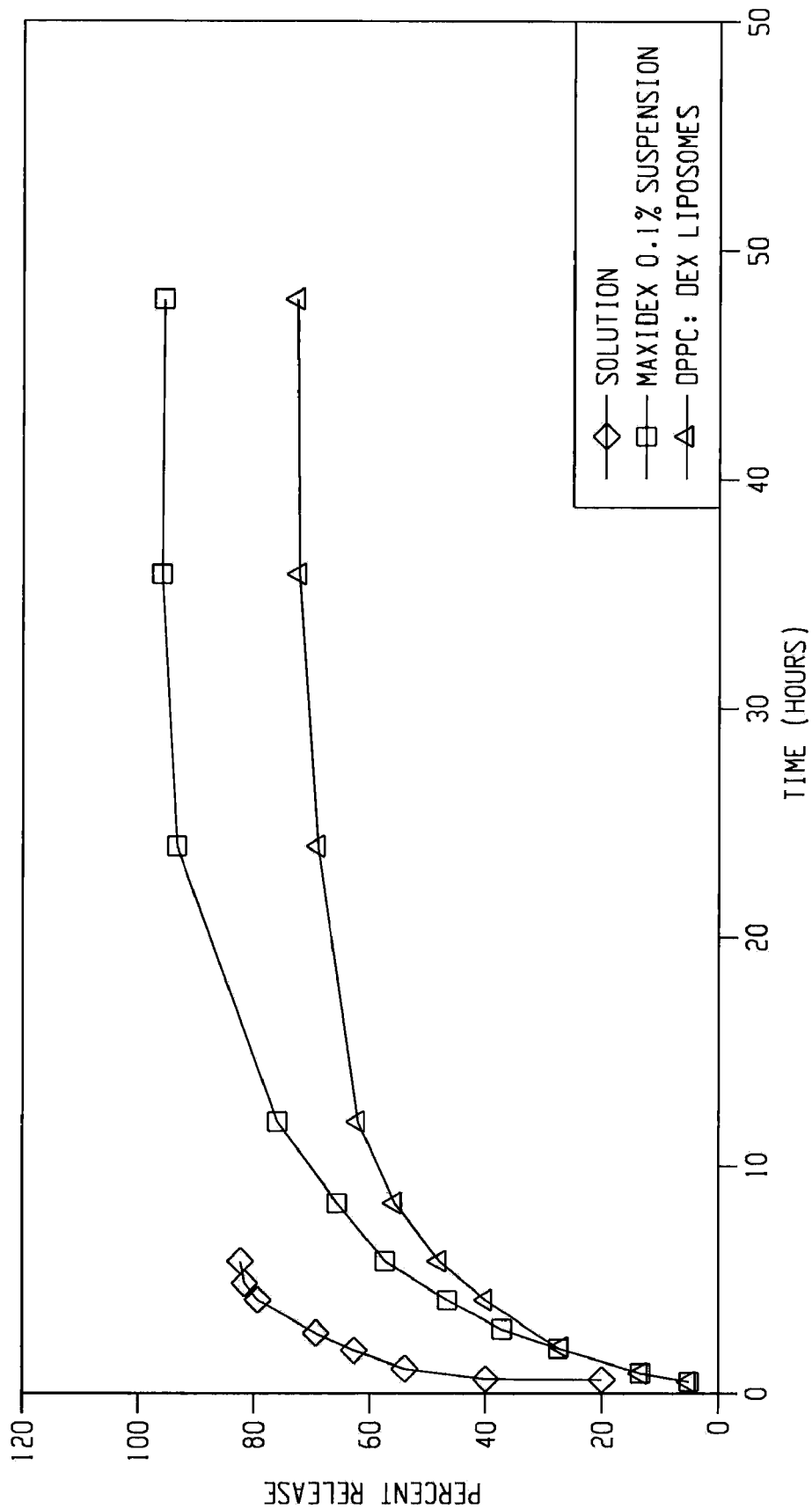
FIG. 11 is a graphic illustration of the comparison of percent release over time from different formulations using the dialysis adapter cell method.

The optimization studies for the DAC method showed that the release of dexamethasone from the solution, suspension and liposome dosage forms was not flow rate limited (FIGS. 6-9). This signifies that adequate agitation was obtained around the dialysis adapter cell in the 22.6 mm diameter sample holder cell at both flow rates. Similarly, the suspension sample volume in the dialysis adapter cell did not influence the percent release (FIG. 10), but the method was sensitive enough to show the difference in the time it took to reach the plateau concentration for the higher sample volume (FIG. 10; secondary y-axis). The DAC method was also able to distinguish the drug release from the solution, suspension and non-extruded DPPC liposome formulations of dexamethasone (FIG. 11). These studies illustrate the utility of the dialysis adapter cell in conjunction with the USP dissolution apparatus 4 system for release testing of colloidal dosage forms.

Analysis of the Discriminatory Ability of the DAC Method

Dexamethasone release profiles (at 16 ml/min) from the solution, suspension, and non-extruded DPPC liposomes formulations were compared to investigate the ability of the DAC method to discriminate between formulation types. FIG. 11 graphically shows three distinct release profiles for each of the three formulations as a function of percent release over time. As can be seen, drug diffusion from the solution formulation was the fastest, while dexamethasone release from the Maxidex® suspension and the non-extruded DPPC liposomes formulations were slower. Both the suspension and liposome formulations released over a period of 24 hours, whereas diffusion from the solution formulation occurred in 5-6 hours.

Analysis of the Discriminatory Ability of the DS, RDS, and DAC Release Methods for Liposome Formulations Dexamethasone release profiles at 16 ml/min from non-extruded and extruded liposome formulations were compared for the Example 1, 2, and 3 release methods. The discriminatory ability of the DS (Ex. 1), RDS (Ex. 2), and DAC (Ex. 3) methods was evaluated using the liposome formulations of phospholipids DMPC, DPPC, and DSPC. The physicochemical properties of these liposomes are known. The non-extruded liposomes of DMPC, DPPC, and DSPC have different physicochemical properties compared to sonicated and extruded liposomes of the same lipids. The multilamellar non-extruded liposomes have larger particle size and approximately twice the drug encapsulation efficiency. Moreover, DMPC, DPPC, and DSPC liposomes have different phase transition behavior. The phase transition temperatures of DMPC, DPPC, and DSPC are about 23.5° C., 41.4° C., and 54.5° C., respectively. Therefore, different in vitro drug release profiles can be expected from liposomes prepared using these three lipids at 37° C. In these examples, the non-extruded liposomes showed slower release compared to the extruded liposomes of the same phospholipid. A reliable in vitro release testing method, therefore, should be able to distinguish between these formulation variants.

Dialysis Sac (DS) Method

Figure 12:
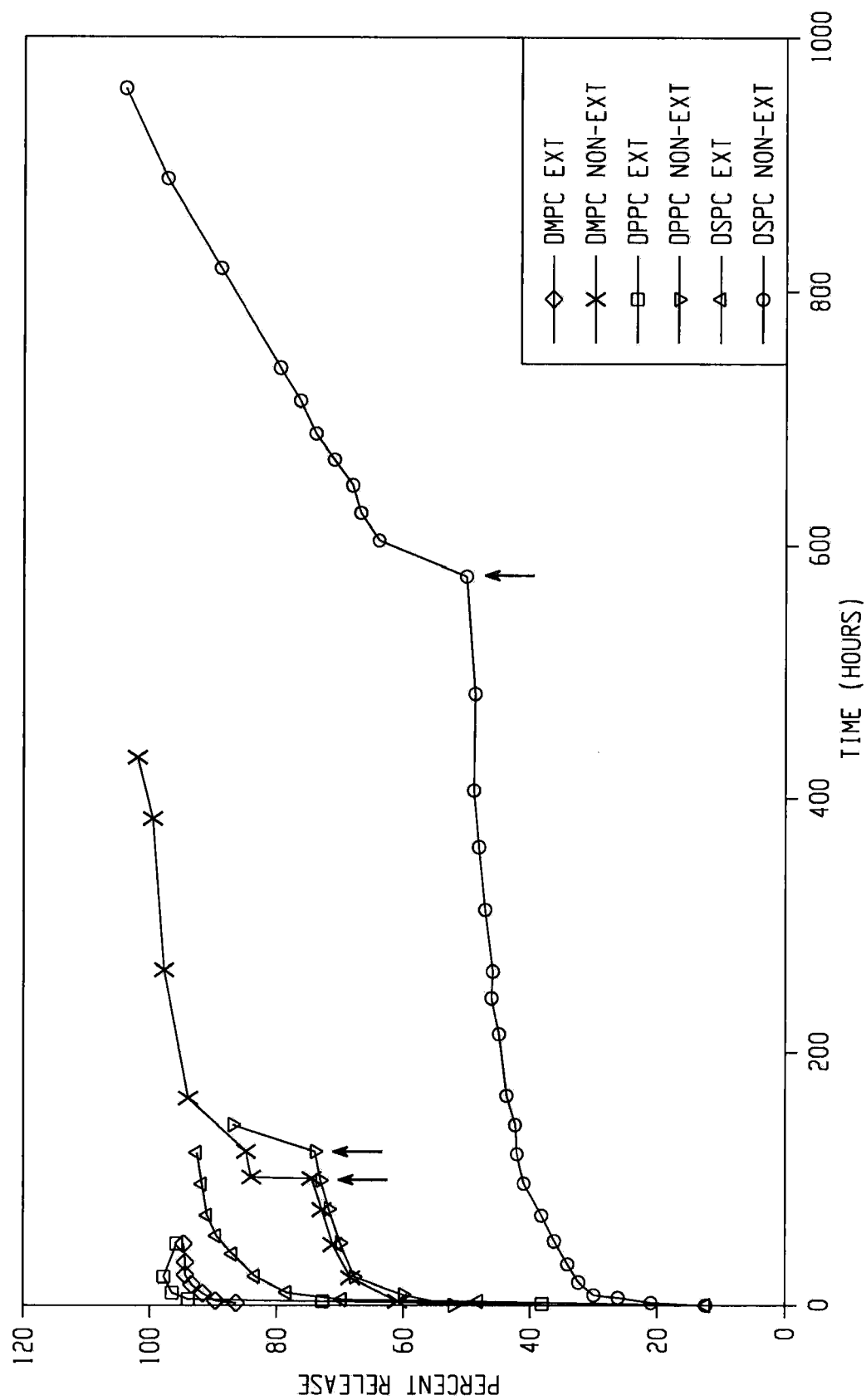
FIG. 12 is a graphic illustration of the comparison of percent release over time from the extruded and non-extruded liposome formulations of DMPC, DPPC, and DSPC using the dialysis sac method.

The release profiles as a function of time for the DS method are shown in the FIG. 12 graph. FIG. 12 graphically illustrates the release profiles for both extruded and non-extruded liposome formulations of DMPC, DPPC, and DSPC. As can be seen in the figure, the DS method was able to discriminate between the non-extruded and extruded liposomes of the same lipid. The release profiles of the extruded liposomes were faster compared to the non-extruded liposomes for all three lipids. For example, looking at the DSPC lipids, the graph shows a clear discrimination between the extruded and non-extruded formulations. The DSPC extruded liposomes had a much faster release in total duration than the non-extruded form. This holds true for each of the lipids, but it is most distinguishable with DSPC. Release profiles of the extruded DMPC and DPPC liposomes were similar, while the extruded DSPC was slightly slower. Release from all the extruded liposomes, however, was complete within 72 hours. The non-extruded liposomes showed an initial faster release followed by a much slower release phase extending from slightly less than 200 hours for DPPC to greater than 900 hours for DSPC.

Among the non-extruded liposomes of the three lipids, the DS method was not able to clearly discriminate between the release profiles of DMPC and DPPC liposomes. Table 1 below provides the release percentages of all three liposomes for each release method. At 12 hours, 68.8% and 64.2% release was observed from the non-extruded DMPC and DPPC liposomes, respectively. Release from the non-extruded DSPC liposomes was the slowest at 30.5% in 12 hours. The dexamethasone release profiles plateaued for all the non-extruded liposomes. To achieve complete release, SDS at a final concentration of 0.5% w/v was added to disrupt the liposome membranes.

Reverse Dialysis Sac (RDS) Method

Figure 13:
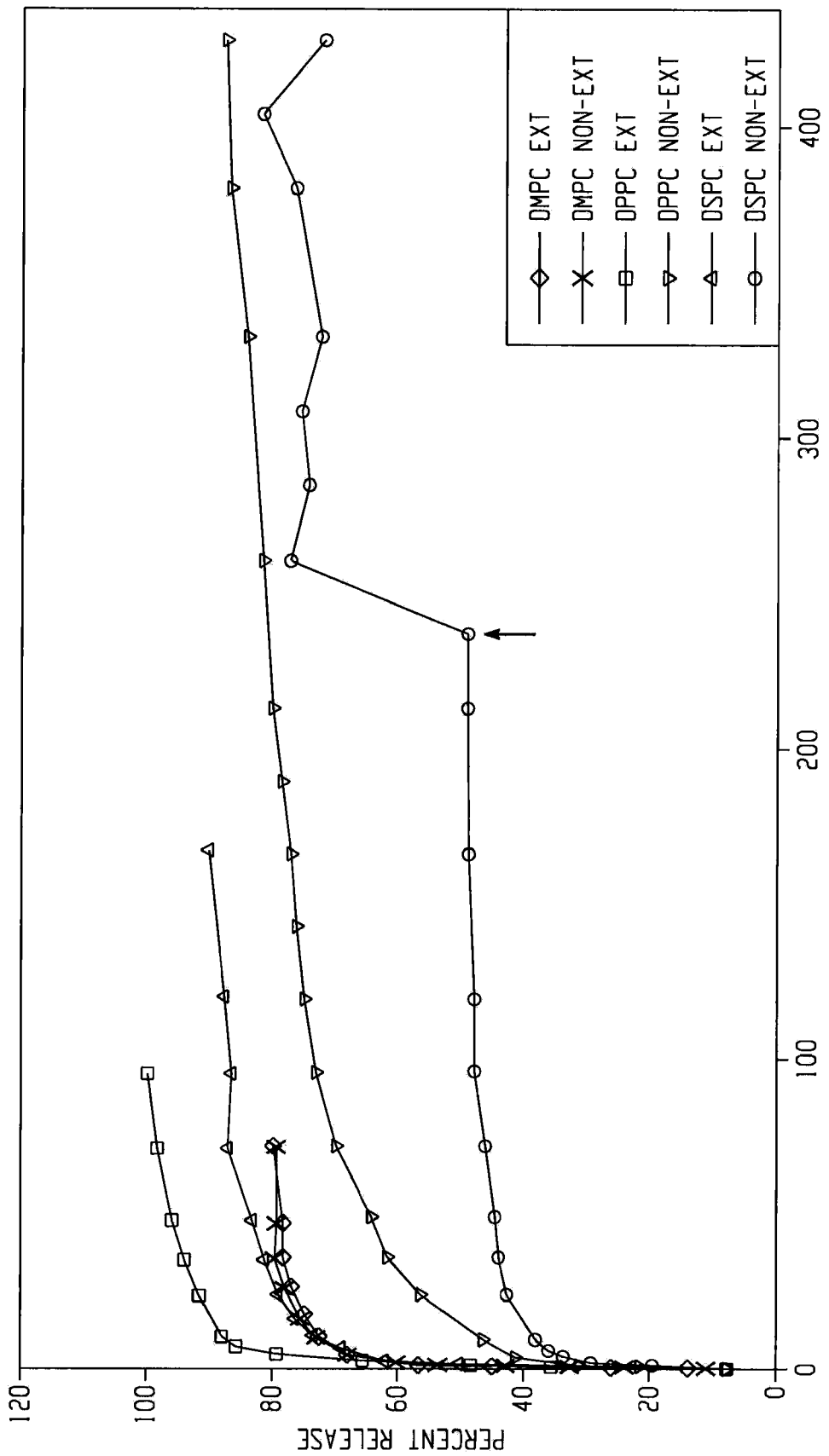
FIG. 13 is a graphic illustration of the comparison of percent release over time from the extruded and non-extruded liposome formulations of DMPC, DPPC, and DSPC using the reverse dialysis sac method.

The release profiles as a function of time for the RDS method are shown in the FIG. 13 graph. FIG. 13 graphically illustrates the release profiles for both extruded and non-extruded liposome formulations of DMPC, DPPC, and DSPC. As can be seen in the figure, the RDS method was not able to discriminate between the release profiles of the non-extruded and extruded DMPC liposomes. As shown in Table 1, release from the non-extruded and extruded DMPC liposomes at 12 hours was 76.4% and 77.6%, respectively. Discrimination, however, could be observed between the release profiles of the non-extruded and extruded DPPC and DSPC liposomes. For DPPC and DSPC, release from the extruded liposomes was much faster (within 72 hours) compared to the non-extruded equivalent liposomes.

The RDS method was able to discriminate among the release profiles of the non-extruded liposomes of the three lipids. The dexamethasone release from the non-extruded liposomes using the RDS method was fastest for DMPC liposomes (77.5% in 12 hours), while DSPC liposomes showed the slowest release (39.2% in 12 hours). Release from the DPPC liposomes was intermediate (48.6% in 12 hours), releasing slowly after day 3 until completion. A plateau existed for the non-extruded DSPC liposomes that were not seen for the other non-extruded liposomes. The DSPC liposome plateau occurred after 168 hours. The addition of SDS increased the release from the non-extruded DSPC liposomes. Unlike the DS method, release from the non-extruded DPPC liposomes was slower than the non-extruded DMPC liposomes using the RDS method.

USP Apparatus 4—Dialysis Adapter Cell (DAC) Method

Figure 14:
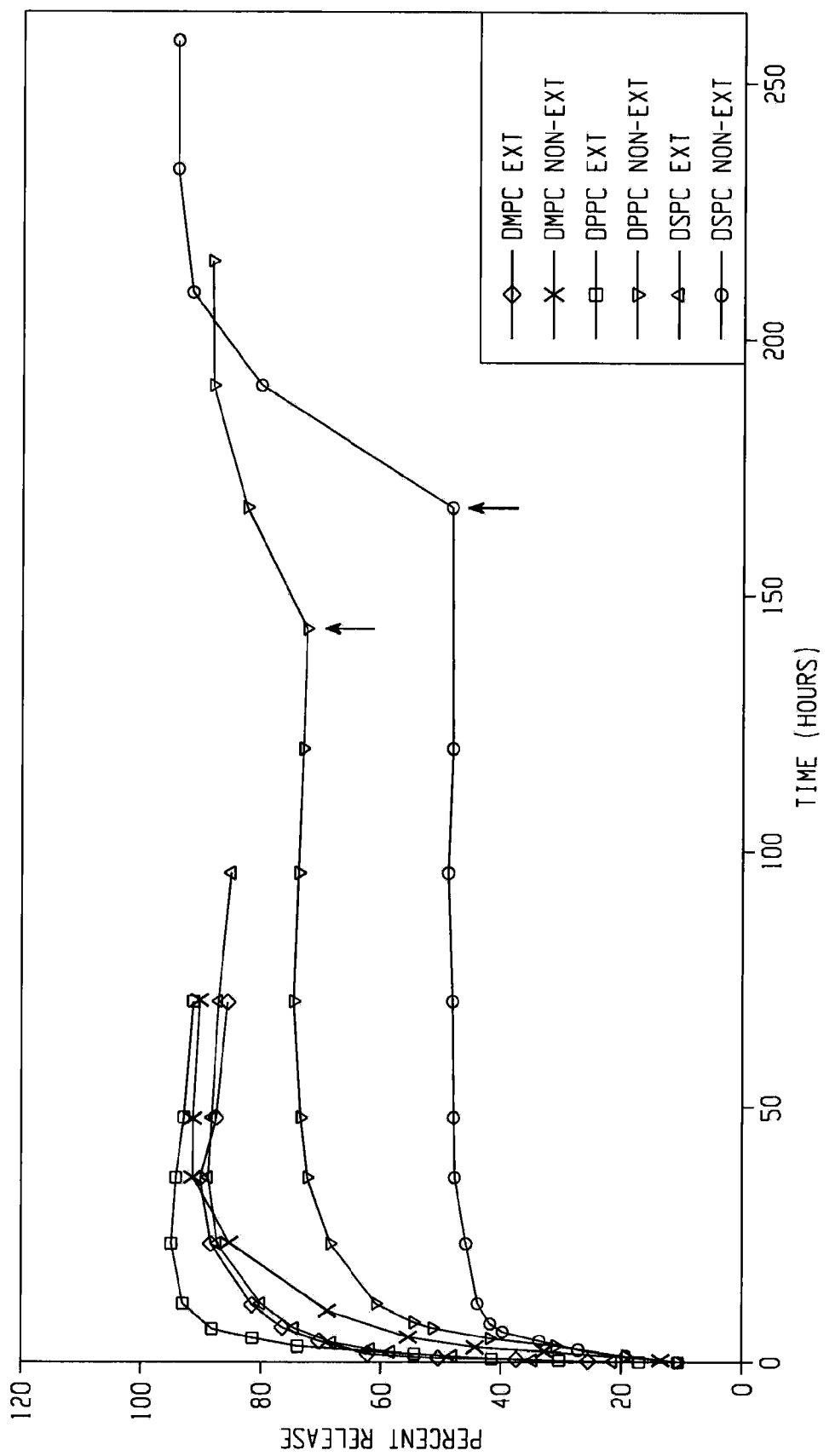
FIG. 14 is a graphic illustration of the comparison of percent release over time from the extruded and non-extruded liposome formulations of DMPC, DPPC, and DSPC using the dialysis adapter cell method.

The release profiles as a function of time for the DAC method are shown in FIG. 14. FIG. 14 graphically illustrates the release profiles for both extruded and non-extruded liposome formulations of DMPC, DPPC, and DSPC. As can be seen in the figure, the DAC method was able to discriminate between the non-extruded and extruded liposomes of the same lipid. Unlike the RDS method, release from the non-extruded DMPC liposomes (70.4% in 12 hours) was slower than that from the extruded liposomes (83.5% in 12 hours) using the DAC method. Again, a faster release of dexamethasone was observed from the extruded liposomes than the non-extruded, with most of the drug released in the first 12 hours.

The DAC method was also able to discriminate among the release profiles of the non-extruded liposomes of the three lipids. At 12 hours, 70.4%, 61.1% and 43.8% drug was released from the non-extruded DMPC, DPPC, and DSPC liposomes, respectively. The non-extruded DPPC and DSPC liposomes did not release all their contents and reached a plateau at day 4. Complete release was obtained following addition of SDS to the release medium.

TABLE 1

| Liposomes | Dialysis Sac | | Reverse Dialysis Sac | | USP apparatus 4 - Dialysis Adapter Cell | |
|---|---|---|---|---|---|---|
| | Extruded | Non-extruded | Extruded | Non-extruded | Extruded | Non-extruded |
| DMPC | 92.1 ± 1.2 | 68.8 ± 4.3 | 76.4 ± 2.5 | 77.6 ± 2.0 | 83.5 ± 1.9 | 70.4 ± 3.9 |
| DPPC | 96.3 ± 1.2 | 64.2 ± 3.6 | 88.2 ± 0.6 | 48.6 ± 2.2 | 92.9 ± 0.6 | 61.1 ± 1.5 |
| DSPC | 79.5 ± 1.7 | 30.5 ± 10.0 | 71.8 ± 1.8 | 39.2 ± 3.2 | 81.2 ± 2.4 | 43.8 ± 2.6 |

Percent release at 12 hours from the extruded and non-extruded DMPC, DPPC, and DSPC liposomes (lipid:drug - 1:0.2M). Each value represents mean +/− SD (n = 3).

Comparison of Release from the Non-Extruded Liposomes by the 3 Methods

Figure 15:
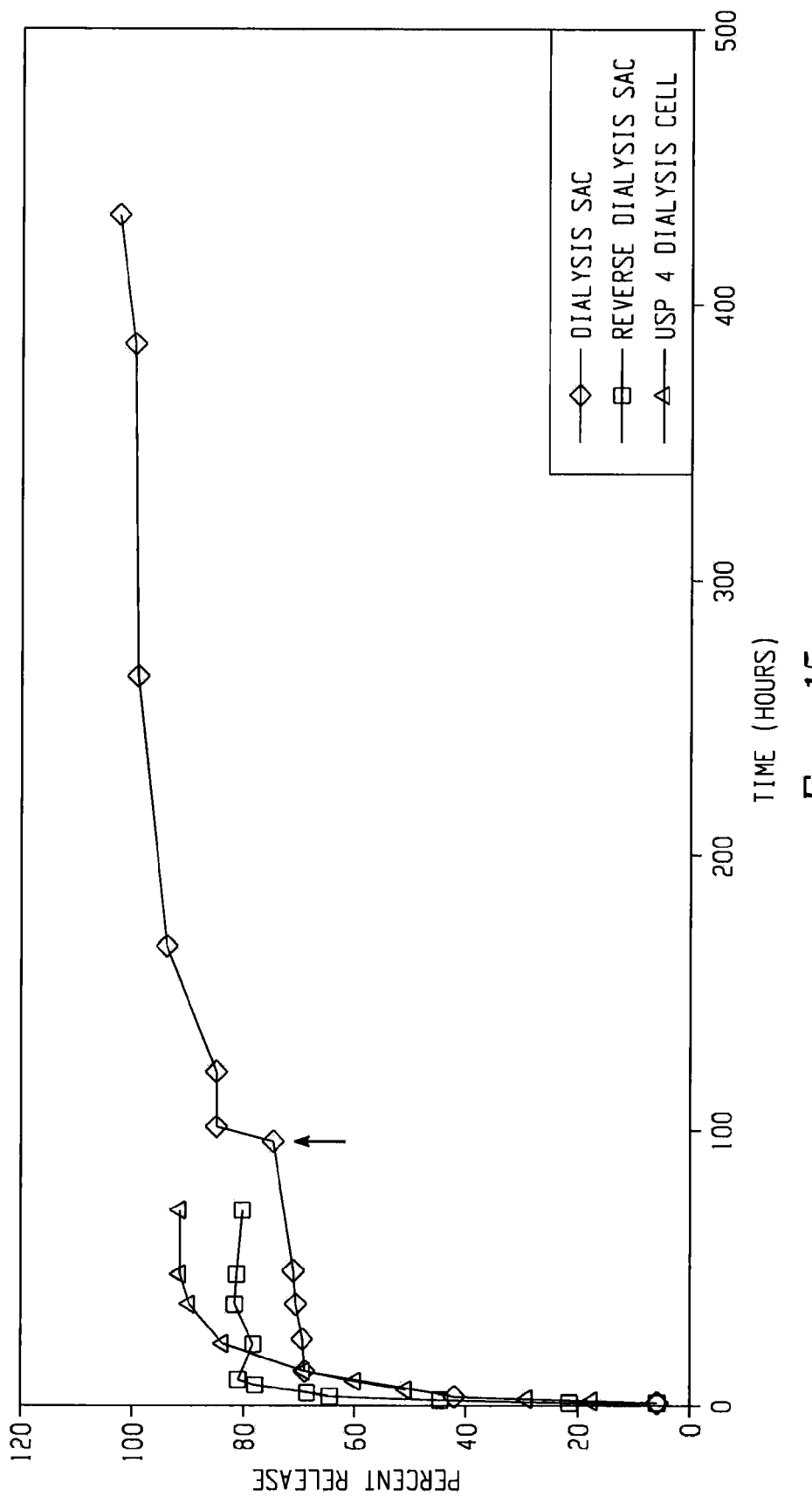
FIG. 15 is a graphic illustration of the comparison of percent release over time from non-extruded DMPC liposomes using the dialysis sac, reverse dialysis sac, and dialysis adapter cell methods.
Figure 16:
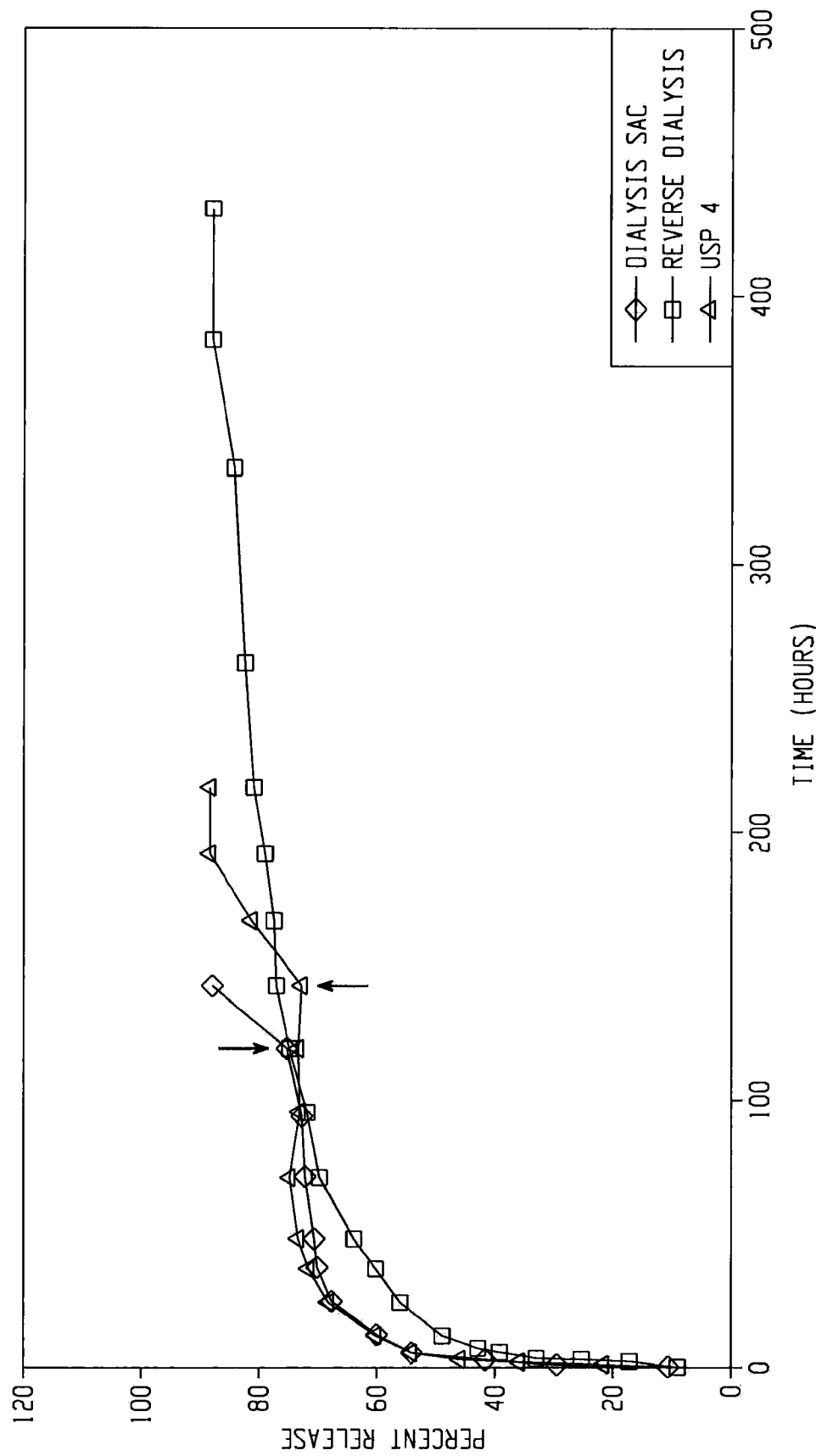
FIG. 16 is a graphic illustration of the comparison of percent release over time from non-extruded DPPC liposomes using the dialysis sac, reverse dialysis sac, and dialysis adapter cell methods.
Figure 17:
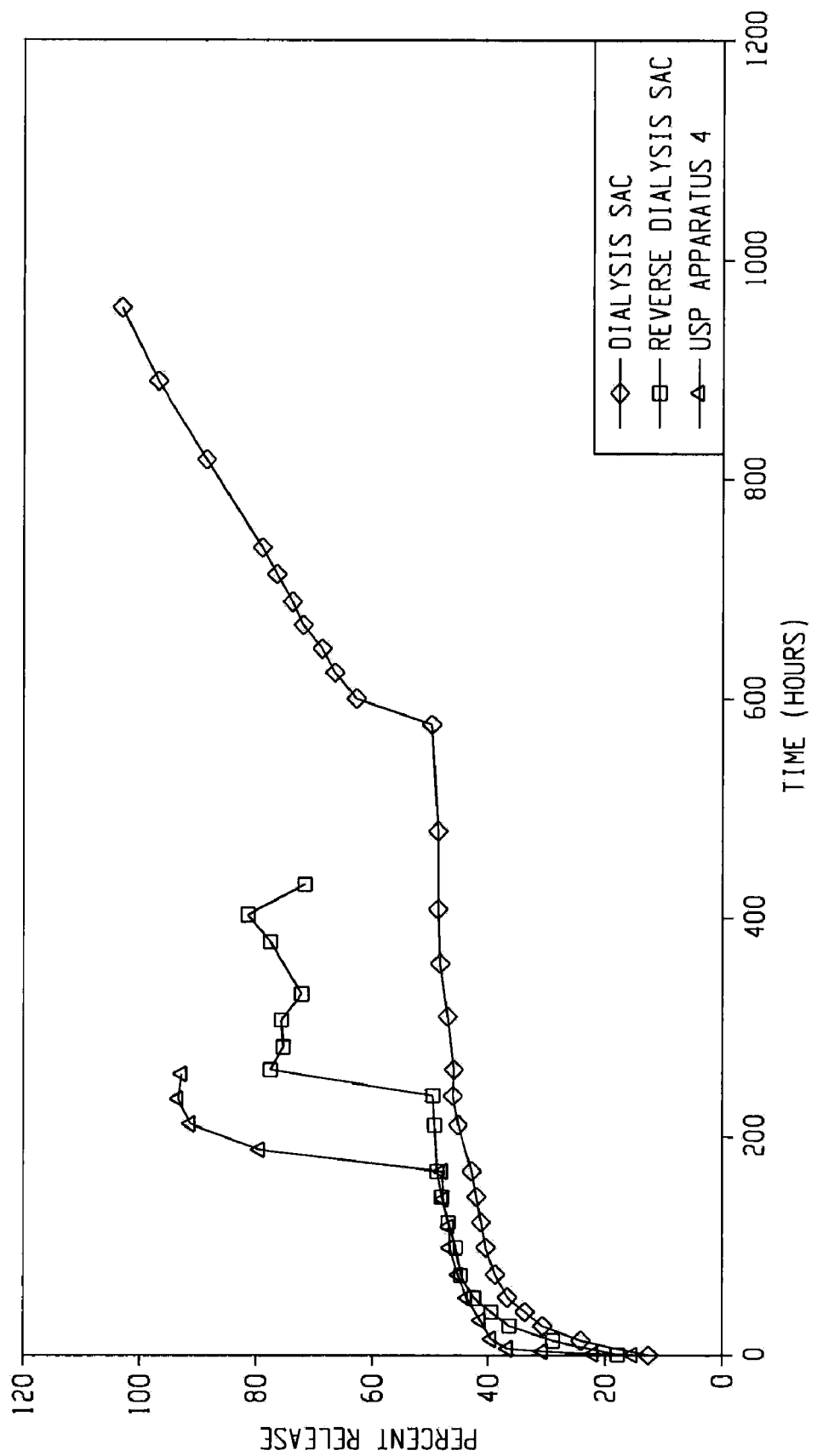
FIG. 17 is a graphic illustration of the comparison of percent release over time from non-extruded DSPC liposomes using the dialysis sac, reverse dialysis sac, and dialysis adapter cell methods.

The release profiles of the non-extruded liposomes for each phospholipid obtained using the three methods were plotted together for comparison. FIG. 15 shows the comparison of the release time from DMPC liposomes for each method; FIG. 16 illustrates the comparison for non-extruded DPPC liposomes; and FIG. 17 illustrates the comparison for non-extruded DSPC liposomes. As shown in FIG. 15, initial 12 hour release from the non-extruded liposomes of the low transition temperature lipid DMPC was faster from DS and RDS methods than the DAC method, but slowed down at later time points. The higher total release, however, was achieved with the DAC method. This higher release was achieved without addition of SDS. In the case of the DS method, addition of SDS was necessary to achieve complete release. FIG. 16 compares the release profiles for the intermediate transition temperature lipid DPPC. The release profile for the DS and DAC methods appeared similar, while the RDS method showed a slower release. The trend was the same for both total and initial release. Addition of SDS led to complete release for the DS and DAC methods after reaching a plateau, while a complete release was observed using the RDS method without addition of SDS. The release profiles for the high transition temperature non-extruded DSPC liposomes are shown in FIG. 17. Overall dexamethasone release using the RDS and DAC methods had similar initial and total release, while the DS method had a slower initial release and a lower total release. However, all three methods produced a similar plateau level (DS about 48%; RDS about 49% and DAC about 48%) that required addition of SDS for complete recovery from the DSPC liposomes.

As seen from the examples above, the dialysis adapter cell in combination with the USP apparatus 4 is capable of providing a disperse dosage release test able to discriminate between different formulation variants. This is an essential aspect of in vitro release methods when used for product development and quality control. As mentioned previously, it has been observed that the non-extruded liposomes of DMPC, DPPC, and DSPC have different phase transition behavior. Moreover, the physicochemical properties of the three lipids as non-extruded liposomes are different than the sonicated and extruded liposomes of the lipids. The multilamellar non-extruded liposomes have larger particle size and approximately twice the drug encapsulation efficiency. Different in vitro drug release profiles, therefore, were expected from liposomes prepared using these three lipids at 37° C.

In summary, only the DAC method was able to discriminate among the in vitro release profiles from different liposome formulations (FIG. 13). Discrimination between the release from the non-extruded and extruded liposomes of all three lipids was obtained using the DAC method. For each lipid used, dexamethasone release from the non-extruded liposomes was slower compared to release from the extruded liposomes. In addition, discrimination was also observed among the non-extruded liposomes of DMPC, DPPC, and DSPC using the DAC method. The DS and RDS methods, however, could not discriminate between the different liposome formulations. The DS method could not discriminate between the non-extruded DMPC and DPPC liposomes (FIG. 12) due to the slower release of dexamethasone in the DS method from the DMPC liposomes compared with the DAC and RDS methods (FIG. 15). Therefore, sink conditions appear to be violated in the DS method in the case of fast releasing formulations, which in turn led to slower release from the non-extruded DMPC liposomes. This might be due to the inadequate agitation in the DS method. The RDS method could not discriminate between the release from the non-extruded and extruded DMPC liposomes (FIG. 13). It appears that the higher dilution in the RDS method masked the difference in the physicochemical properties of the non-extruded and extruded DMPC liposomes. Therefore, both DS and RDS methods might have limitations when used for in vitro release testing of fast releasing formulations.

Further comparison of the DS, RDS and DAC methods for non-extruded liposomes of the same lipid showed that the percent release for the DAC method was the highest or similar to the next highest method (FIG. 15). Moreover, release profiles obtained using the DAC method showed low variation among the replicates. These results underscore the robustness of the flow-through USP dissolution apparatus 4 in providing adequate agitation and maintaining temperature uniformity in the sample holder cells. The dialysis adapter cell utilizes these advantages of the USP dissolution apparatus 4. As such, the DAC method presents a platform to mimic in vivo conditions. Release conditions can easily be changed during a run to provide biorelevant conditions such as addition of serum or enzymes, change in temperature or pH, and addition of a surfactant. It could also be possible to use this method for formulations where a membrane dialysis based method is recommended at present. For example, semisolid topical formulations for which a Franz-diffusion cell is recommended.

To reiterate, the dialysis adapter cell and its method of use with the USP apparatus 4 system has the discriminatory ability for in vitro release testing of liposomes and other dispersed formulations. The DAC method was able to discriminate between liposome formulations of different lipids. Discrimination was also achieved for the extruded and non-extruded formulation variants of the same lipid. In addition, differences between solution, suspension, and liposomes formulation were observed with the DAC method. Again, the dialysis and reverse dialysis sac methods could not discriminate between all the formulation variants. This dialysis adapter cell fulfills a need for a method based on a compendial apparatus, because such a repeatable and discriminatory method can help in product development; quality assurance; and regulatory process of disperse dosage forms.

Ranges disclosed herein are inclusive of the endpoints and all intermediate values, and independently combinable. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments. As used herein, the terms sheet, film, plate, and layer, are used interchangeably, and are not intended to denote size. Further as used herein, a dissolution medium is inclusive of a dissolution medium. All references are incorporated herein by reference in their entirety.

While the invention has been described with reference to several embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A dialysis adapter cell configured to be removably disposed in a United States Pharmacopoeia dissolution apparatus 4 flow-through cell, the dialysis adapter cell comprising:
   a housing comprising a plurality of pillars extending between and attached to a top plate and a bottom plate to form a hollow receptacle, wherein the top plate has an aperture configured to provide access to an inside of the hollow receptacle;
   a lid configured to close and seal the aperture in the top plate;
   a dialysis membrane disposed about the housing and sealingly engaged to the top plate and the bottom plate; and
   a platform in physical communication with the bottom plate and configured to fit within a diameter of a sample holder of the United States Pharmacopoeia dissolution apparatus 4 flow-through cell,
   wherein the platform is further configured to vertically align the dialysis adapter cell within the sample holder, wherein the dialysis adapter cell is characterized by an axis that is perpendicular to the top plate and the bottom plate, said axis being vertically aligned.

2. The dialysis adapter cell of claim 1, wherein the top plate and the bottom plate each comprise a groove disposed about a circumference of the top plate and the bottom plate, wherein the groove is configured to receive a sealing member for sealing the dialysis membrane to the top plate and the bottom plate.

3. The dialysis adapter cell of claim 1, wherein the diameter of the sample holder is about 22.6 millimeters.

4. The dialysis adapter cell of claim 1, wherein the diameter of the sample holder is about 12 millimeters.

5. The dialysis adapter cell of claim 1, wherein the housing has a diameter of about 9 millimeters, the top plate and the bottom plate have a thickness of about 3 millimeters respectively, and the dialysis adapter cell has a total height of about 33 millimeters and a total volume of about 1.7 milliliters.

6. The dialysis adapter cell of claim 1, wherein the housing has a diameter of about 6 millimeters, the top plate and the bottom plate have a thickness of 2.5 millimeters respectively, and the dialysis adapter cell has a total height of about 48 millimeters and a total volume of about 1.1 milliliters.

7. A system for in vitro release testing of a colloidal disperse system in a United States Pharmacopoeia dissolution apparatus 4 system, the system for in vitro testing comprising
   a dissolution medium reservoir configured to hold a dissolution medium;
   a pump in fluid communication with the dissolution medium reservoir;
   a flow-through cell in fluid communication with the pump, wherein the pump is configured to move the dissolution medium through the flow-through cell, and wherein the flow-through cell comprises a sample holder mounted in fluid communication with a filter system; and
   a dialysis adapter cell disposed within the sample holder and configured to contain a disperse dosage form, wherein the dialysis adapter cell comprises
   a housing having a plurality of pillars extending between and attached to a top plate and a bottom plate to form a hollow receptacle, wherein the top plate has an aperture configured to provide access to an inside of the hollow receptacle;
   a dialysis membrane disposed about the housing and sealingly engaged to the top plate and the bottom plate;
   a platform in physical communication with the bottom plate configured to vertically align the dialysis adapter cell in the sample holder;
   wherein the dialysis adapter cell is characterized by an axis that is perpendicular to the top plate and the bottom plate, said axis being vertically aligned.

8. The system of claim 7, wherein a lower portion of the sample holder has a conical shape.

9. The system of claim 8, wherein the platform positions the dialysis adapter cell above the lower portion of the sample holder.

10. The system of claim 8, further comprising a plurality of beads disposed in the lower portion of the sample holder.

11. The system of claim 7, wherein the disperse dosage form comprises an emulsion, microemulsion, nanoemulsion, microsuspension, nanosuspension, liposome, cubosome, inclusion complex, nanosphere, nanocapsule, nanochelate, or a combination comprising at least one of the foregoing disperse dosage forms.

12. The system of claim 7, wherein the sample holder has a diameter of about 22.6 millimeters.

13. The dialysis adapter cell of claim 12, wherein the housing has a diameter of about 9 millimeters, the top plate and the bottom plate have a thickness of about 3 millimeters, respectively, and the dialysis adapter cell has a total height of about 33 millimeters and a total volume of about 1.7 milliliters.

14. The system of claim 7, wherein the sample holder has a diameter of about 12 millimeters.

15. The dialysis adapter cell of claim 14, wherein the housing has a diameter of about 6 millimeters, the top plate and the bottom plate have a thickness of 2.5 millimeters, respectively, and the dialysis adapter cell has a total height of about 48 millimeters and a total volume of about 1.1 milliliters.

16. A method for in vitro release testing of a disperse dosage form in a United States Pharmacopoeia dissolution apparatus 4 system, the method comprising:
- placing the disperse dosage form in a dialysis adapter cell, wherein the dialysis adapter cell comprises
  - a housing having a plurality of pillars extending between and attached to a top plate and a bottom plate to form a hollow receptacle, wherein the top plate comprises an aperture configured to provide access to the hollow receptacle,
  - a dialysis membrane disposed about the housing and sealingly engaged to the top plate and the bottom plate, and
  - a platform in physical communication with the bottom plate;
- placing the dialysis adapter cell in a vertical position in a sample holder of a flow-through cell, wherein the dialysis adapter cell is characterized by an axis that is perpendicular to the top plate and the bottom plate, said axis being vertically aligned;
- pumping a dissolution medium through the flow-through cell to contact the dialysis adapter cell; and
- detecting a component of the disperse dosage form in the dissolution medium.

17. The method of claim 16, further comprising recirculating the dissolution medium and withdrawing a sample from the dissolution medium at a predetermined time.

18. The method of claim 17, further comprising replenishing the dissolution medium after withdrawing the sample.

19. The method of claim 16, wherein the dissolution medium is not recirculated; the method further comprising collecting aliquots of the dissolution medium after contact with the dialysis adapter cell.

20. The method of claim 16, wherein the dissolution medium is pumped through the flow-through cell at a flow rate of about 1.5 to about 50 milliliters per minute.

21. The method of claim 16, wherein the disperse dosage form comprises an emulsion, microemulsion, nanoemulsion, microsuspension, nanosuspension, liposome, cubosome, inclusion complex, nanosphere, nanocapsule, nanochelate, or a combination comprising at least one of the foregoing disperse dosage forms.

* * * * *